(12) United States Patent
Salvino et al.

(10) Patent No.: US 12,044,636 B1
(45) Date of Patent: Jul. 23, 2024

(54) LOCATING MINING SITES USING NEUTRON DETECTION

(71) Applicants: Chris Salvino, Scottsdale, AZ (US); Andrew Dummer, Chapel Hill, NC (US)

(72) Inventors: Chris Salvino, Scottsdale, AZ (US); Andrew Dummer, Chapel Hill, NC (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 18/538,102

(22) Filed: Dec. 13, 2023

(51) Int. Cl.
| | |
|---|---|
| *G01N 23/204* | (2006.01) |
| *B64G 1/16* | (2006.01) |
| *B64G 1/66* | (2006.01) |
| *G01V 5/02* | (2006.01) |
| *G01V 9/00* | (2006.01) |
| *G21G 4/02* | (2006.01) |

(52) U.S. Cl.
CPC ............. *G01N 23/204* (2013.01); *B64G 1/16* (2013.01); *B64G 1/66* (2013.01); *G01V 5/02* (2013.01); *G01V 9/007* (2013.01); *G21G 4/02* (2013.01); *G01N 2223/053* (2013.01); *G01N 2223/1066* (2013.01)

(58) Field of Classification Search
CPC .. G01N 23/201; G01N 23/202; G01N 23/203; G01N 23/204; G01V 5/02; G01V 5/025
USPC ........................................... 250/269.1, 269.5
See application file for complete search history.

(56) References Cited

U.S. PATENT DOCUMENTS

| | | | | |
|---|---|---|---|---|
| 3,240,971 | A * | 3/1966 | Morgan | H01J 47/1261 376/153 |
| 3,828,189 | A * | 8/1974 | Givens | G01V 5/102 376/164 |
| 4,095,102 | A * | 6/1978 | Tixier | G01V 5/105 250/269.4 |
| 4,180,729 | A * | 12/1979 | Givens | G01V 5/108 250/269.4 |
| 4,180,730 | A * | 12/1979 | Givens | G01V 5/108 250/269.4 |
| 4,223,218 | A * | 9/1980 | Jacobson | G01V 5/108 250/269.5 |
| 4,224,516 | A * | 9/1980 | Johnstone | G01V 5/108 250/269.5 |

(Continued)

*Primary Examiner* — Allen C. Ho
(74) *Attorney, Agent, or Firm* — Kenneth Altshuler

(57) ABSTRACT

Disclosed is a He-3 detector arrangement that generally comprises a neutron shield interposed between a thermal neutron source and thermal neutron detectors all resting on a metal platform. In operation, thermal neutrons from the thermal neutron source are emitted when the He-3 detector arrangement is on or near the ground. Some of the thermal neutrons from the neutron source backscatter from the regolith to the neutron detector where a baseline count level is registered. When He-3 is present in the regolith, some of the thermal neutrons are absorbed by the He-3, which reduces the detected count rate. When integrated with a rover, the He-3 detector is moved from place to place with the count rates at each location compared. In this manner, higher and lower levels of He-3 in the regolith can be mapped indicating target regions for mining the He-3.

20 Claims, 7 Drawing Sheets

(56) References Cited

U.S. PATENT DOCUMENTS

| | | | | |
|---|---|---|---|---|
| 4,268,749 A * | 5/1981 | Mills, Jr. | G01V 5/10 250/269.4 |
| 4,721,853 A * | 1/1988 | Wraight | G01V 5/108 250/269.7 |
| 4,808,838 A * | 2/1989 | Gold | G01V 5/107 250/266 |
| 4,947,040 A * | 8/1990 | Mahdavi | G01V 5/107 250/269.7 |
| 4,952,801 A * | 8/1990 | Gold | G01V 5/107 250/269.5 |
| 4,972,082 A * | 11/1990 | Loomis | G01V 5/107 250/269.4 |
| 5,083,029 A * | 1/1992 | Buchanan | G01N 23/204 250/390.05 |
| 5,128,541 A * | 7/1992 | Mahdavi | G01V 5/107 250/269.5 |
| 5,180,917 A * | 1/1993 | Wraight | G01T 1/40 250/269.4 |
| 5,252,832 A * | 10/1993 | Nguyen | G01N 23/09 250/269.4 |
| 5,349,184 A * | 9/1994 | Wraight | G01V 5/107 250/269.4 |
| 5,481,105 A * | 1/1996 | Gold | E21B 43/04 250/269.4 |
| 7,514,694 B2 | 4/2009 | Stephan et al. | |
| 7,633,058 B2 * | 12/2009 | Stoller | G01V 5/107 250/390.11 |
| 7,919,758 B2 | 4/2011 | Stephan et al. | |
| 8,330,115 B2 | 12/2012 | Frank | |
| 9,477,005 B2 * | 10/2016 | Chandrasekharan | G01V 5/281 |
| 9,590,128 B2 * | 3/2017 | Cauffiel | G01T 3/08 |
| 9,632,188 B2 * | 4/2017 | Chandrasekharan | G01T 3/001 |
| 9,923,115 B2 * | 3/2018 | Cauffiel | H01L 31/03529 |
| 10,048,402 B2 * | 8/2018 | Qian | G01T 1/185 |
| 11,906,692 B2 * | 2/2024 | Zhang | G01V 5/045 |
| 11,927,552 B2 * | 3/2024 | Shifflett | G01N 23/204 |
| 2013/0034198 A1 | 2/2013 | Chandrasekharan et al. | |

\* cited by examiner

LOCATING MINING SITES USING NEUTRON DETECTION

CROSS-REFERENCE TO RELATED APPLICATIONS

None

BACKGROUND OF THE INVENTION

3. Field of the Invention

The present invention relates generally to identifying mining sites using neutron detection techniques to map areas of high concentrations of He-3 to be mined.

4. Description of Related Art

Identifying the concentration of target materials, such as He-3, that are intended to be mined before diving into mining operations holds immense value. Having a general idea of target element concentration within a mining site enables a more efficient strategy of extraction methods effectively, minimizing unnecessary loss of time and expense. By conducting, at least, a cursory assessments of target material concentration, mining ventures can employ better targeted and efficient extraction techniques, reducing the need for extensive excavation and processing. This approach not only conserves precious resources used to mine the target materials but also mitigates the disruption to the general mining location.

Moreover, knowing the target material concentration beforehand significantly influences the economic viability of a mining project. Accurate assessments allow for informed decisions about whether to proceed with extraction, avoiding costly endeavors where the target material concentration might be too low to yield minimum returns. By identifying regions of high target material concentration, mining operations can more efficiently use their resource allocation, directing investments toward sites with higher concentrations, thereby maximizing the efficiency and profitability of their operations while minimizing lost time and unnecessary mining costs. Ultimately, the value of identifying target materials concentrations prior to mining lies in its ability to ensure a more efficient approach to target material extraction.

It is to innovations related to this subject matter that the embodiments of the invention are generally directed.

SUMMARY OF THE INVENTION

The present invention generally relates to an apparatus for mining and collecting He-3 as well as other target gaseous elements from extra-terrestrial bodies in a very low-pressure environment. A very low pressure is defined as below 7 millibars.

In that light, certain embodiments of the present invention envision a helium-3 detection arrangement as shown in comprising a thermal neutron source and a thermal neutron detector. More specifically, the thermal neutron source can comprise a thermal neutron emitter encapsulated in a hydrogen rich material, wherein the thermal neutron source is configured to emit thermal neutrons in all directions. The thermal neutron detector can be configured to detect a concentration of the thermal neutrons. In the arrangement, a neutron shield is interposed between the thermal neutron source and the thermal neutron detector. The neutron shield is configured to block some of the thermal neutrons emitted from the thermal neutron source that are aimed at the thermal neutron detector (such as attenuating at least 90% of the neutrons that are between the shield and the thermal neutron detector). A power source, such as a battery or solar system, for example, is configured to provide power to the thermal neutron source and the thermal neutron detector. A metal plate has a periphery, which is the sidewall boundary of the metal plate shown by the four side. The thermal neutron source, the thermal neutron detector, and the neutron shield are disposed on the metal plate within the periphery.

Another embodiment of the present invention envisions a helium-3 detection system comprising generally comprising a thermal neutron detector sensing a quantity of neutrons emitted from a thermal neutron source to evaluate a concentration of He-3 in regolith or some other granular soil. More specifically, the embodiment envisions the thermal neutron source configured to emit thermal neutrons in all directions wherein the thermal neutron detection system is configured to detect a neutron concentration of the thermal neutrons backscattered from granular soil. A neutron shield is interposed between the thermal neutron source and the thermal neutron detector to isolate the neutrons detected from the regolith thereby assessing a quantity or concentration of He-3 in the regolith. A power source, such as a battery, can be included with the system to provide power to the thermal neutron source and the thermal neutron detection system. The neutron shield, the thermal neutron source, and the thermal neutron detection system are envisioned to be disposed on a metal plate that is configured to be placed within 10 cm of a surface of the granular soil.

Yet another embodiment of the present invention envisions an arrangement that detects helium-3 in regolith on the Moon. The arrangement can comprise a neutron source that is configured to emit thermal neutrons, a neutron detector that is configured to detect a neutron concentration of the neutrons that are backscattered from the regolith and a neutron shield that is interposed between the neutron source and the neutron detector. The neutron shield is configured to block at least some of the neutrons in a line-of-sight between the neutron source and the neutron detector. The arrangement can also include a power source that is configured to provide power to the thermal neutron source, the thermal neutron detection system, and a transmitter. The transmitter is configured to transmit the neutron concentration/s to a remote receive. The neutron shield, the thermal neutron source, and the thermal neutron detection system are envisioned to be disposed on a metal plate. The arrangement is further envisioned to be moved to different locations on the surface of the Moon via a transporter.

DETAILED DESCRIPTION

Figure 1A:
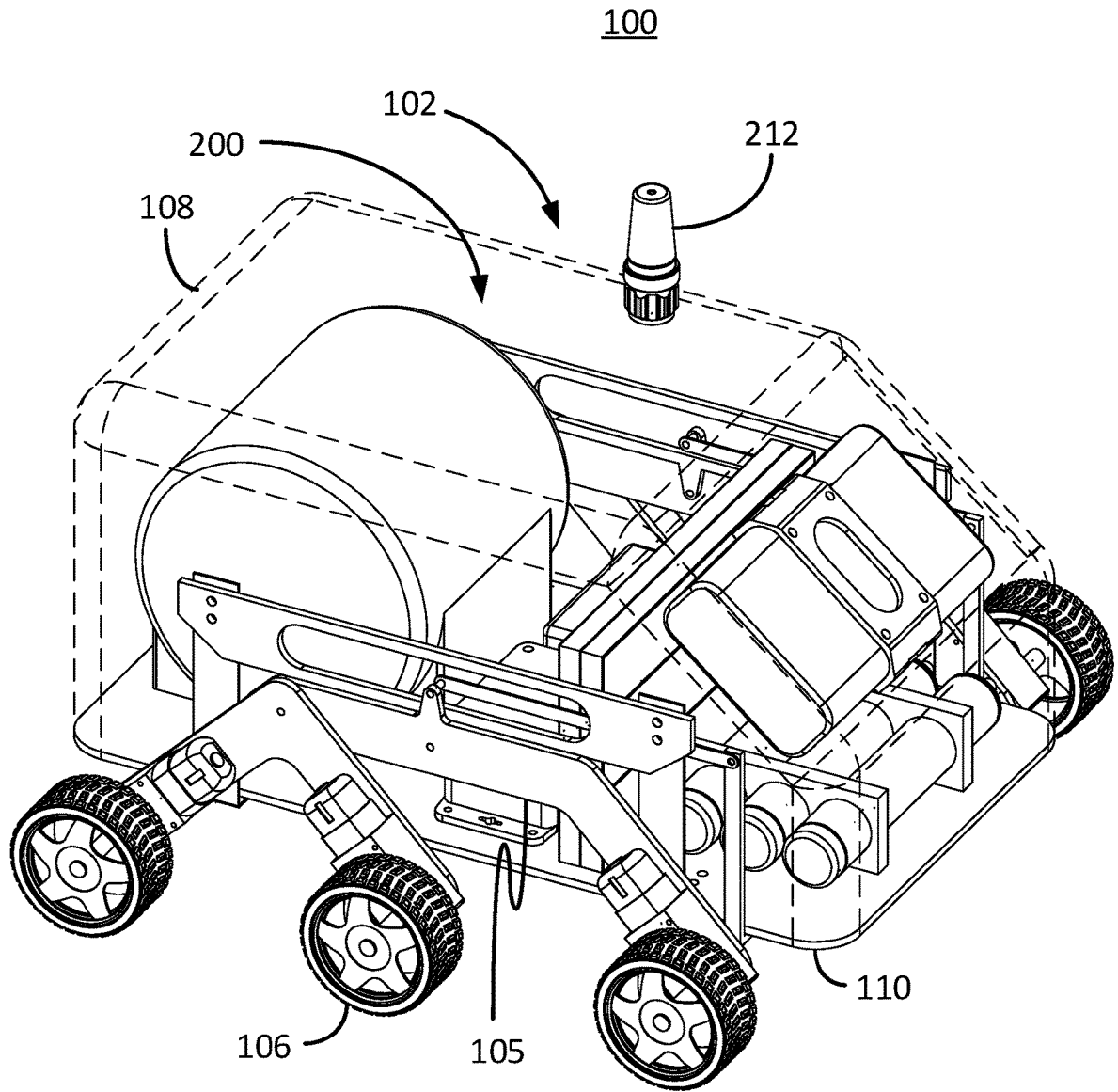
FIG. 1A is a line drawing of a transport and He-3 detector embodiment consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to identification of target materials in an extremely low-pressure and low gravity environment. Extremely low-pressure environment is defined herein as below 7 millibars, wherein pressure at sea-level on Earth is approximately 1 bar. Low gravity is defined herein as at most 4 m/sec$^2$. Aspects of the present invention consider mining gaseous atoms and molecules on extraterrestrial bodies, such as the Moon, asteroids, moons orbiting other planets, Mars, etc. Many of these extraterrestrial bodies have little to no ambient pressure at or within several meters of their surfaces and depending on the size of the extraterrestrial body, they generally have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3 \times 10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3 (He-3), a light stable isotope of helium having two protons and one neutron, which has promise as an important constituent in fusion reactions, is far more abundant on the Moon than on Earth. In some estimates, He-3 is more than a thousand times more abundant on the Moon than compared to the Earth making the Moon a better target to obtain He-3.

Certain embodiments of the present invention envision identifying target material concentrations on the surface or within several feet of the surface of the Moon by way of detecting backscattered neutron concentrations from moon regolith, or simply "regolith". In this way, target material to be mined can be mapped in mining regions of interest.

Accordingly, some embodiments of the present invention contemplate a He-3 detector arrangement that generally comprises a neutron shield that is interposed between a thermal neutron source and three thermal neutron detectors all resting on a metal platform. In operation, thermal neutrons from the thermal neutron source are emitted when the He-3 detector arrangement is either sitting directly on the ground (regolith) or just above it. Some of the thermal neutrons from the neutron source will backscatter from the regolith where they will be detected by the thermal neutron detection system and a baseline count level will be registered. When He-3 is present in the regolith, some of the thermal neutrons will be absorbed by the He-3 reducing the detected count rate. When integrated into a rover, the arrangement can be either moved from place to place with count rates at each location compared, or the rover might creep slowly along the surface. In this manner, higher and lower levels of He-3 in the regolith can be mapped.

Referring to the drawings, FIG. 1A is a line drawing of a transport and He-3 detector embodiment 100 consistent with embodiments of the present invention. The transport and He-3 detector 100 generally comprises a helium-3 (He-3) detector 200 that is depicted as being supported or otherwise carried by a rover 102. The rover 102 comprises an ambulatory arrangement, which in this embodiment are wheels 106 that are mounted on a suspension system 105 but could just as easily be comprised of tracks, robotic legs, or some other kind of ambulation arrangement to carry the He-3 detector 200 to different sites on the surface of the Moon. As shown, the He-3 detector 200 is resting atop a metal plate 110 and is essentially encapsulated by a cover 108. An antenna 212, which extends from cover 108, is connected to a transmitter and possibly a transceiver (not shown). The antenna 212 facilitates at least one way communication, such as by RF, with a receiver that is located away from the rover 102. Other embodiments envision the He-3 detector 200 being integrated with a low gravity skipper 120, like that shown in FIG. 1B, wherein the low gravity skipper 120 jumps off the surface of the Moon 122 and then back down on the surface of the Moon 122 in a different location. The low gravity skipper 120 can use jet propulsion or a spring-loaded platform to skip off the surface of the Moon 122. The spring-loaded platform avoids disrupting the surface 112A of the regolith 112.

Figure 1B:
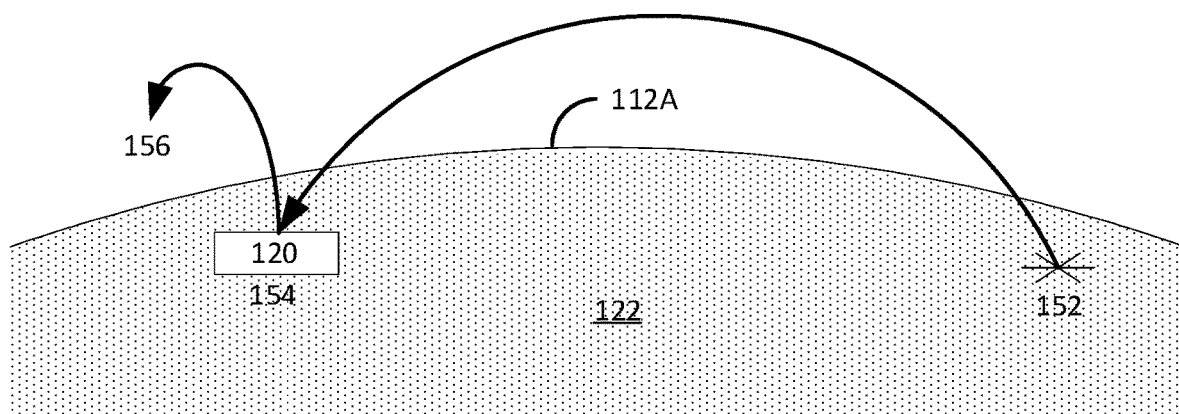
FIG. 1B is a schematic diagram of mapping a region on the Moon with the He-3 detector arrangement onboard a skipper transporter consistent with embodiments of the present invention.

More specifically, FIG. 1B is a schematic diagram of mapping a region on the Moon with the He-3 detector arrangement onboard a skipper transporter consistent with embodiments of the present invention. This embodiment contemplates a skipper transporter 120 that is operable to launch from a first site 152, after evaluating the concentration of He-3 at the first site 152, land at a second site 154 and evaluate the concentration of He-3 at the second site 154 before launching to a third site 156 to evaluate the concentration of He-3 at the third site 156. In this way, a portion of the lunar surface can be mapped out for He-3 concentrations to target ideal locations to mine He-3. Because the gravity on the Moon is about ⅙ the Earth's gravity, the energy required to launch (and land) the skipper 120 is significantly less. The skipper transporter 120 can be a spring-loaded vehicle or pod and can be held level (maintain an upright orientation while skipping) with a gyroscope or jet packs. Optionally, the skipper transporter 120 can be equipped with rockets to skip from location 154 to location 156.

Figure 2A:
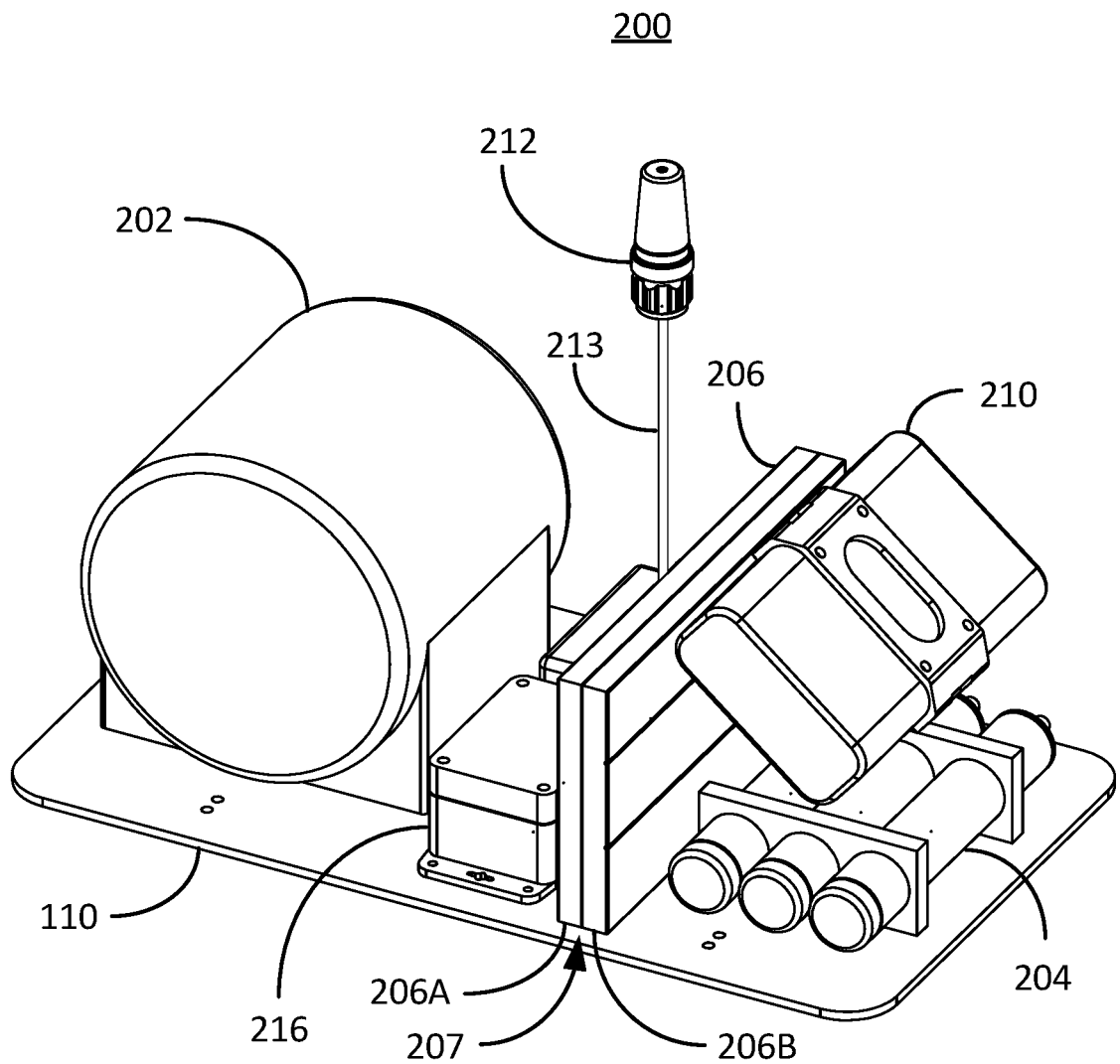
FIGS. 2A-2C are line drawings depicting the He-3 detector arrangement consistent with embodiments of the present invention.
Figure 2B:
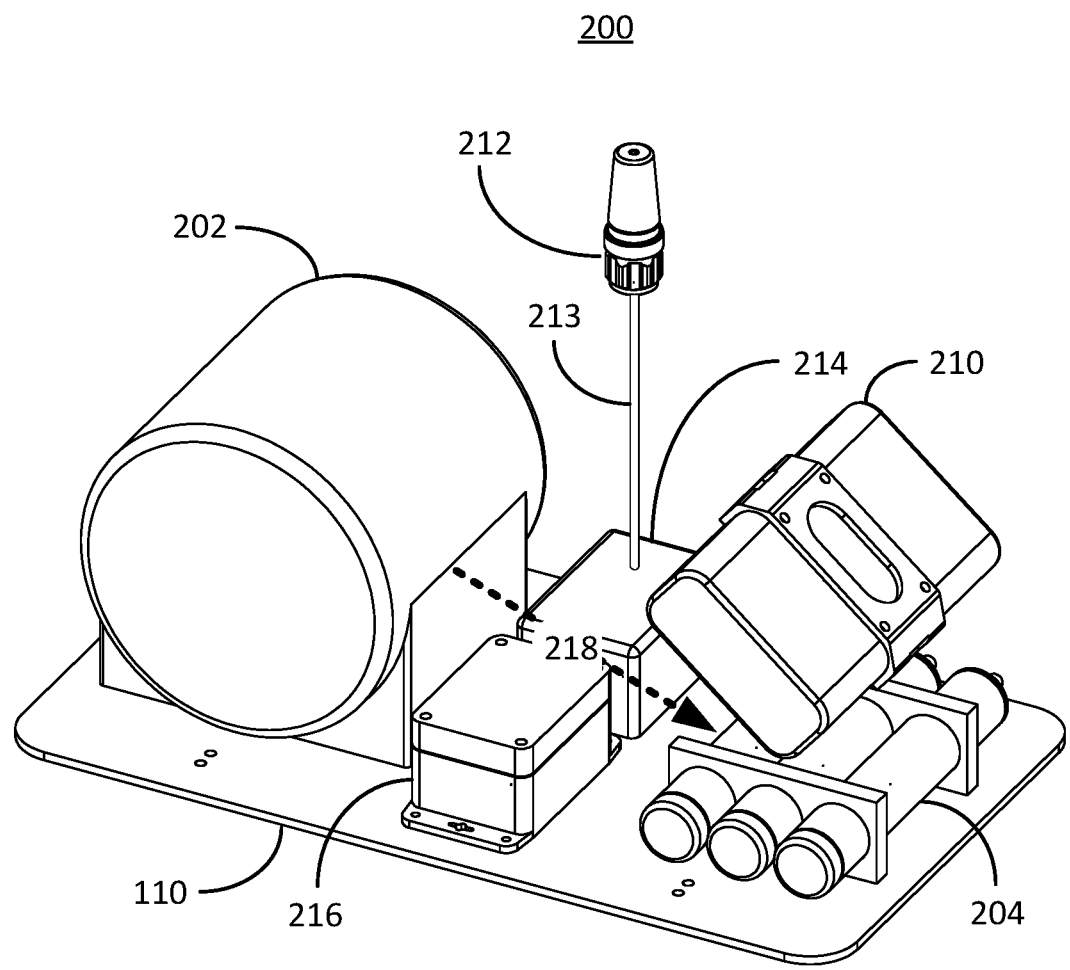
Figure 2C:
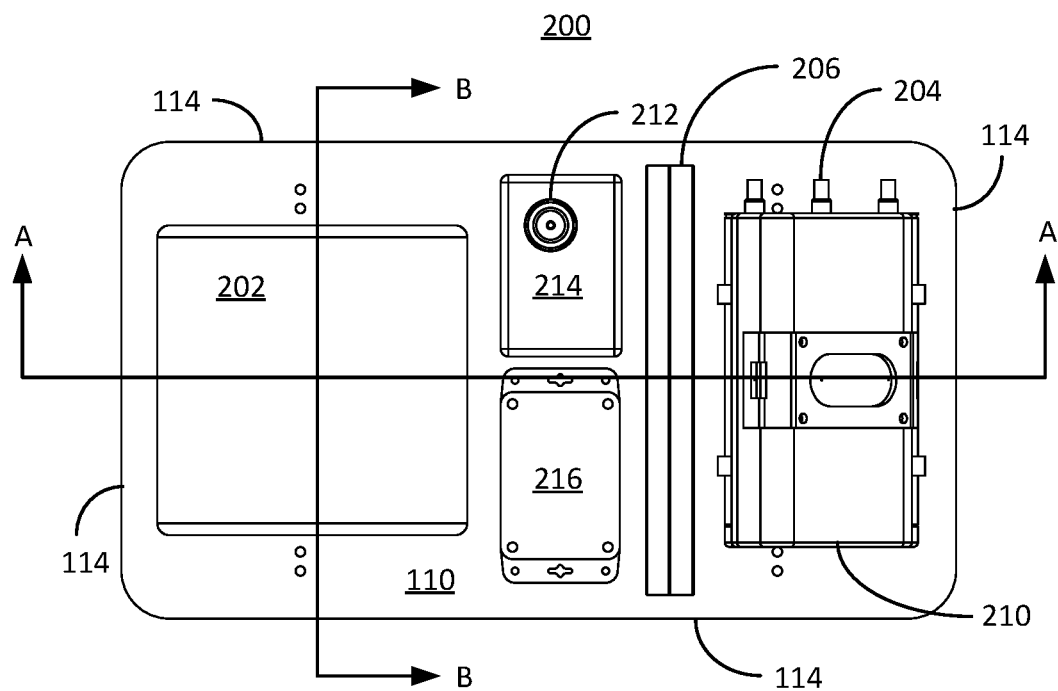

FIGS. 2A-2C are line drawings depicting the He-3 detector arrangement 200 consistent with embodiments of the present invention. As shown in FIG. 2A, is an isometric line drawing of the primary components of the He-3 detector 200 include a neutron shield 206 that is interposed between a thermal neutron source 202 and three thermal neutron detectors 204. The neutron shield 206 blocks the line-of-sight 218 of a percentage of thermal neutrons 222 that are emitted from the thermal neutron source 202 from impacting the thermal neutron detectors 204. The line-of-sight 218 is defined as a straight line along which an observer, in this case the thermal neutron source 202 has an unobstructed view of the thermal neutron detector arrangement 204. In one embodiment, the neutron shield 206 is envisioned to be two 1-2 inch thick borated HDPE (High density polyethylene) that is produced by EMCO Industrial Plastics, LLC, headquartered in Cedar Grove, NJ. The borated HDPE is specially designed for nuclear shielding applications. The material employs 5% Boron by weight to shield neutrons in a variety of applications including high intensity X-rays, cancer treatment facilities, hospitals, nuclear submarines and nuclear power plants. A 1-inch-thick plate should attenuate the thermal neutrons 222 to about 5% in the line-of-sight 218 on the other side of the neutron shield 206, and two 1-inch-thick plate should attenuate the flux to about 0.025% of the thermal neutrons 222 in the line-of-sight 218 on the other side of the neutron shield 206. In other words, two plate should attenuate or otherwise block 99.25% of the neutrons from reaching the thermal neutron detectors 204. In the present embodiment, the two plates 206A and 206B are separated by a lead sheet 207. As further shown, the neutron shield 206, the thermal neutron source 202, the thermal neutron detectors 204, the battery pack 210, the antenna 212 and antenna connection line 213 are all supported by the metal plate 110.

FIG. 2B is a line drawing that illustratively depicts the He-3 detector arrangement 200 of FIG. 2A but without the neutron shield 206 to show the line-of-sight 218 between the thermal neutron source 202 and thermal neutron detector apparatus 204. The line-of-sight 218 is the direct path between the thermal neutron source 202 and three thermal neutron detectors 204, which essentially comprise the thermal neutron detector apparatus 204.

The thermal neutron detector apparatus 204 is sensitive to the amount of neutrons 222 that impact the detector apparatus 204 and therefore is capable of providing information about the neutron concentrations it encounters. There are several commercially available thermal neutron detectors 204 including BF3 Counter Tubes from Mirion Technologies headquartered in Atlanta, Georgia. This thermal neutron detector uses boron trifluoride (BF3) neutron counters. The neutron sensitivity of these proportional counters is achieved by filling the tube with the gas boron-tri-fluoride, made of highly enriched Boron-10. Thermal neutrons react with the isotope Boron-10 emitting alpha particles, which produce ionization in the gas filling of the detector (electrons and gas ions). In the electrical field between the electrodes these charged particles will be accelerated and secondary ionization happens. This so called "gas amplification" multiplies proportionally the amount of charge generated in the tube.

FIG. 2C is a top view line drawing of the He-3 detector arrangement 200 depicting the elements with respect to the cut-lines A-A and B-B. For reference, the electronics enclosure 216 are shown, which contain the necessary computing and electronics to run the various electrical elements comprised by the He-3 detector 200 and the communications housing 214 that houses the communications transmitter or possibly a transceiver. The antenna 212 is linked to the communications circuitry in the communications housing 214. Also shown are the battery 210, thermal neutron source 202, the neutron shield 206 and the thermal neutron detector apparatus 204. The thermal neutron detector apparatus 204 comprises three detectors in this embodiment but can have as few as one detector or as many as desired. Cut-line A-A essentially bisects the metal plate 110 and the thermal neutron source 202, the neutron shield 206 and the thermal neutron detector apparatus 204. Cut-line B-B, which is orthogonal to cut-line A-A, bisects the thermal neutron source 202.

Figure 2D:
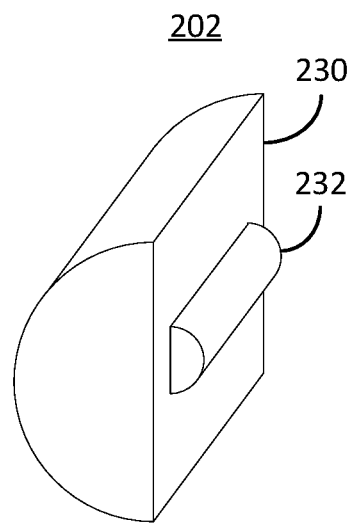
FIG. 2D is a block diagram depicting the thermal neutron source embodiment along cut-line B-B consistent with embodiments of the present invention.

FIG. 2D is a block diagram depicting the thermal neutron source embodiment 202 along cut-line B-B consistent with embodiments of the present invention. This embodiment of the thermal neutron source 202 can include an Americium Beryllium (AmBe) neutron source (core) 232 encapsulated within a hydrogen rich shell 230, which in this embodiment is envisioned to be a polyethylene shell. The polyethylene shell 230 thermalizes the neutrons by reducing their energy through collisions with the hydrogen nuclei in the polyethylene. AmBe thermal neutron sources are commercially available by QSA Global, Inc., headquartered in Burlington, MA. An alternative thermal neutron source 202 comprises an integrated moderator neutron generator, such as deuterium-tritium or deuterium-deuterium neutron generators, for example, which are commercially available from Adelphi Technology, Inc., headquartered in Redwood City, CA. Accordingly, certain embodiments of the present invention envision the thermal neutron source 202 being an off-the-shelf thermal neutron source readily commercially available.

Figure 2E:
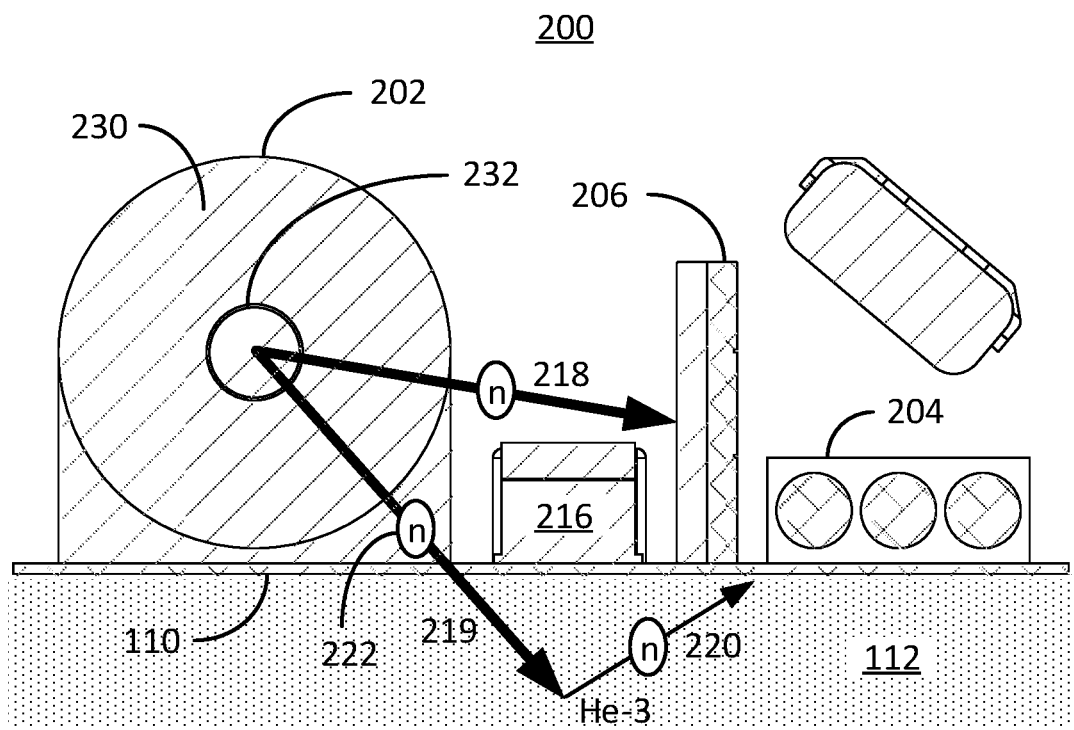
FIG. 2E is a line drawing of a cross-section of the He-3 detector arrangement along cut-line A-A consistent with embodiments of the present invention.

FIG. 2E is a line drawing of a cross-section of the He-3 detector arrangement 200 along cut-line A-A consistent with embodiments of the present invention. He-3 is known to absorb neutrons. Hence, the concentration of neutrons passing through He-3 will consequently be reduced. In the present arrangement 200, some of the neutrons emitted from the thermal neutron source 202, as shown in arrow 219, will backscatter from the regolith 112 to the thermal neutron detector 204 (see narrow arrow 220) with some of the neutrons in arrow 219 being absorbed by He-3 present in the regolith 112. Accordingly, the concentration of He-3 in the regolith 112 will be inversely proportional to the concentration of neutrons detected by the thermal neutron detector 204 relative to those neutrons emitted by the thermal neutron source 202. In other words, the higher the concentration of He-3 present in the regolith 112, the lower the number of neutrons will reach the thermal neutron detector 204, which is represented by the narrower arrow 220. The neutrons in the line-of-sight 218 of the neutron detector 204 are blocked by the neutron shield 206 from hitting the neutron detector 204 to improve the resolution of the backscattered neutron concentration 220. The metal plate 110, which in some embodiments is aluminum, does not change the number of neutrons that penetrate into the regolith 112 (as emitted by the thermal neutron source 202). In accordance with this arrangement 200, the concentration of neutrons detected by the thermal neutron detector 204 are compared with the concentration of neutrons produced by the thermal neutron source 202 to provide an indication of He-3 concentration in a region of regolith 112. Though an accurate amount of He-3 may not be obtainable, a relative amount may be, which is sufficient to identify and map out high interest areas on the Moon for mining He-3 based on sampling different areas/regions on the Moon. Data acquisition and computing can be done via the electronics and computer system 216 on the He-3 detector arrangement 200.

Figure 3:
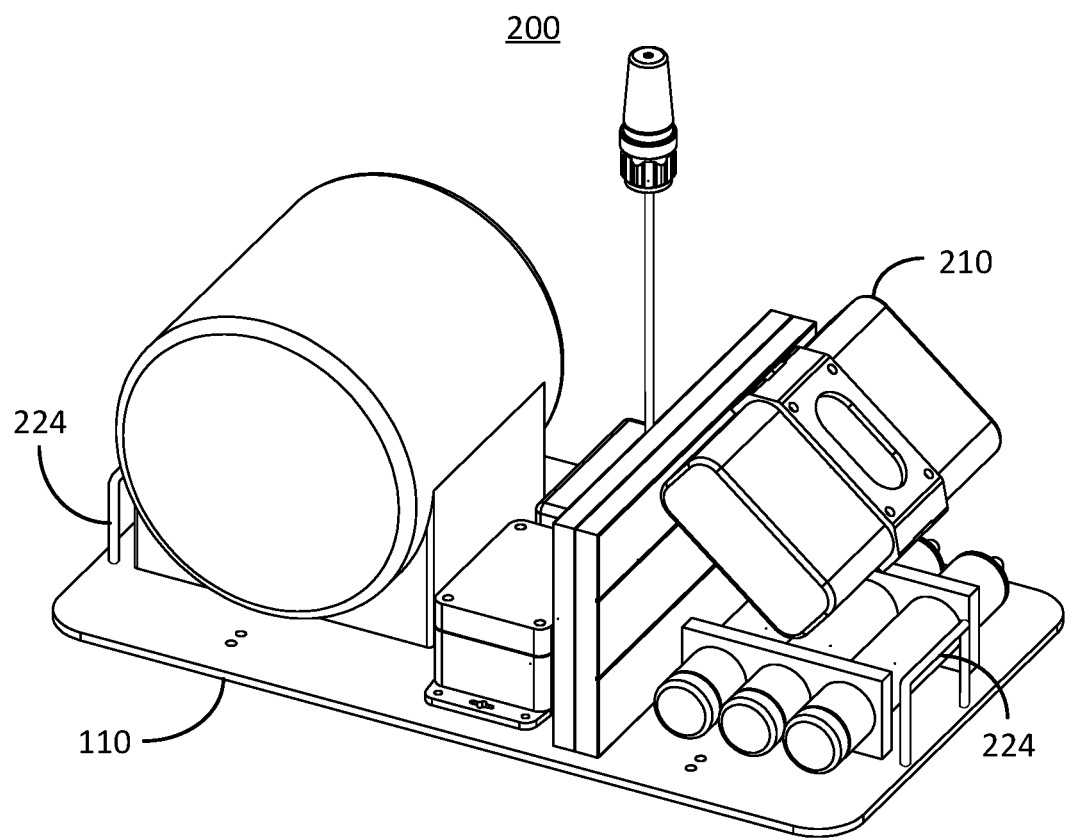
FIG. 3 is a line drawing of another embodiment of the He-3 detector arrangement comprising handles consistent with embodiments of the present invention.

FIG. 3 is a line drawing of another embodiment of the He-3 detector arrangement 200 comprising handles 224 that can be used to carry or otherwise transport the He-3 detector arrangement 200 from location to location manually or via a robot.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a helium-3 detection arrangement 200 as shown in FIGS. 2A-2E comprising a thermal neutron source 202 and a thermal neutron detector 204. More specifically, the thermal neutron source 202 can comprise a thermal neutron emitter 232 encapsulated in a hydrogen rich material 230, wherein the thermal neutron source 202 is configured to emit thermal neutrons 222 in all directions (see FIG. 2E). The thermal neutron detector 204 can be configured to detect a concentration 220 of the thermal neutrons 218. In the arrangement 200, a neutron shield 206 is interposed between the thermal neutron source 202 and the thermal neutron detector 204. The neutron shield 206 is configured to block some of the thermal neutrons 222 emitted from the thermal neutron source 202 that are aimed at the thermal neutron detector 204 (such as attenuating at least 90% of the neutrons 222 that are between the shield 206 and the thermal neutron detector 204). A power source 210, such as a battery or solar system, for example, is configured to provide power to the thermal neutron source 202 and the thermal neutron detector 204. A metal plate 110 has a periphery 114, which is the sidewall boundary of the metal plate 110 shown by the four side 114. The thermal neutron source 202, the thermal neutron detector 204, and the neutron shield 206 are disposed on the metal plate 110 within the periphery 114.

A rover 102 is envisioned, in another embodiment, to support the helium-3 detection arrangement 200, wherein the rover 102 positions the metal plate 110 within 10 cm of a surface 112A of granular soil 112. The helium-3 detection arrangement 200 envisions the concentration 220 being influenced by a helium-3 concentration in the granular soil 112.

In another embodiment of the helium-3 detection arrangement 200, the metal plate 110 is aluminum.

The helium-3 detection arrangement 200 can further comprise a wireless communicator 212 and 214 that is configured to communicate the concentration 220 to a receiver, such as a receiver at a remote hub or remote station that is evaluating the concentration 220 at each location sampled (from 152 and 154 to 156, as shown in FIG. 1B). In some embodiments, the concentration 220 can be determined with respect to time.

In another embodiment of the helium-3 detection arrangement 200, the metal plate 110 is at least part of a rover base of a rover 102.

The helium-3 detection arrangement 200 further envisions the metal plate 110 being located less than 10 cm from a granular surface 112A when the thermal neutron source 202 is emitting the neutrons 222.

The helium-3 detection arrangement 200 imagines an embodiment wherein the metal plate 110 comprises handles 224 that are configured to be carried by at least one human or robot.

The helium-3 detection arrangement 200 imagines an embodiment wherein the metal plate 110 is attached to a low gravity skipper 120.

Another embodiment of the present invention envisions a helium-3 detection system 200 comprising generally comprising a thermal neutron detector 204 sensing a quantity of neutrons 222 emitted from a thermal neutron source 202 to evaluate a concentration of He-3 in regolith 112 or some other granular soil. More specifically, the embodiment envisions the thermal neutron source 202 configured to emit thermal neutrons 222 in all directions wherein the thermal neutron detection system 204 is configured to detect a neutron concentration 220 of the thermal neutrons 222 backscattered from granular soil 112. A neutron shield 206 is interposed between the thermal neutron source 202 and the thermal neutron detector 204 to isolate the neutrons detected from the regolith 112 thereby assessing a quantity or concentration of He-3 in the regolith 112. A power source 210, such as a battery, can be included with the system to provide power to the thermal neutron source 202 and the thermal neutron detection system 204. The neutron shield 206, the thermal neutron source 202, and the thermal neutron detection system 204 are envisioned to be disposed on a metal plate 110 that is configured to be placed within 10 cm of a surface 112A of the granular soil 112.

The helium-3 detection system 200 further imagines the neutron shield 206 being configured to block at least 90% of the thermal neutrons 222 emitted from the thermal neutron source 202, the neutrons 222 being aimed 218 at the thermal neutron detection system 204.

The helium-3 detection system 200 further envisions the neutron concentration 220 that is detected by the thermal neutron detection system 204 being inversely proportional to a concentration of helium-3 in the granular soil 112.

The helium-3 detection system 200 envisions and embodiment where the neutron shield 206 is a boronated shield.

The helium-3 detection system embodiment 200 can further comprise a transmitter 214 that is configured to transmit the neutron concentration 220 to a remote receiver.

The helium-3 detection system 200 envisions mapping out a region for He-3 concentration using the helium-3 detection system 200 by moving it to different locations (from 152 and 154 to 156, as shown in FIG. 1B) on the surface 112A of a celestial body 122 via transport that is selected from a group consisting of a rover 102, a low gravity skipper 120 or a robot (not shown).

The helium-3 detection system 200 envisions the neutron shield 206 being at between 1 and 4 inches thick depending on the desired amount of neutron attenuation on the thermal neutron detection system side of the neutron shield 206.

Yet another embodiment of the present invention envisions an arrangement 200 that detects helium-3 in regolith 112 on the Moon 122. The arrangement 220 can comprise a neutron source 202 that is configured to emit thermal neutrons 222, a neutron detector 204 that is configured to detect a neutron concentration 220 of the neutrons 222 that are backscattered 220 from the regolith 112 and a neutron shield 206 that is interposed between the neutron source 202 and the neutron detector 204. The neutron shield 206 is configured to block at least some of the neutrons 222 in a line-of-sight 218 between the neutron source 202 and the neutron detector 204. The arrangement 200 can also include a power source 210 that is configured to provide power to the thermal neutron source 202, the thermal neutron detection system 204, and a transmitter 212 and 214. The transmitter 212 and 214 is configured to transmit the neutron concentration/s 220 to a remote receive. The neutron shield 206, the thermal neutron source 202, and the thermal neutron detection system 204 are envisioned to be disposed on a metal plate 110. The arrangement 200 is further envisioned to be moved to different locations from 152 and 154 to 156, as shown in FIG. 1B) on the surface 112A of the Moon 122 via a transporter 102 or 120.

This arrangement 200 further envisions the neutron shield 206 being thick enough and comprising enough attenuating material, such as boron, to attenuate at least 95% of the neutrons 222.

In this arrangement 200 the neutron concentration 220 detected by the neutron detector 204 is inversely proportional to a concentration of helium-3 in the regolith 112.

These exemplified embodiments are not exhaustive of the embodiments presented throughout the description, but rather are merely one example of a contemplated embodiment chain consistent with embodiments of the present invention. In other words, there are numerous other embodiments described herein that are not necessarily presented in the apparatus embodiment examples presented immediately above.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the neutron shield can be different but serve the same purpose without departing from the scope and spirit of the present invention. Moreover, the electronics and computing that enable the functionality of the helium-3 detection system are not described in detail because they either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A helium-3 detection arrangement comprising:
   a thermal neutron source comprising a thermal neutron emitter encapsulated in a hydrogen rich material, the thermal neutron source configured to emit thermal neutrons in all directions;
   a thermal neutron detector configured to detect a concentration of the thermal neutrons;
   a neutron shield interposed between the thermal neutron source and the thermal neutron detector, the neutron shield configured to block some of the thermal neutrons emitted from the thermal neutron source that are aimed at the thermal neutron detector;
   a power source configured to provide power to the thermal neutron source and the thermal neutron detector; and
   a metal plate defining a periphery, wherein the thermal neutron source, the thermal neutron detector, and the neutron shield are disposed on the metal plate within the periphery.

2. The helium-3 detection arrangement of claim 1, further comprising a rover configured to position the metal plate within 10 cm of a surface of granular soil.

3. The helium-3 detection arrangement of claim 2, further comprising a computer system configured to correlate the concentration of the thermal neutrons with a helium-3 concentration in the granular soil.

4. The helium-3 detection arrangement of claim 1, wherein the metal plate is aluminum.

5. The helium-3 detection arrangement of claim 1, further comprising a wireless communicator configured to transmit the concentration of the thermal neutrons.

6. The helium-3 detection arrangement of claim 5, wherein the concentration of the thermal neutrons is with respect to time.

7. The helium-3 detection arrangement of claim 1, further comprising a rover that comprises a rover base that includes the metal plate.

8. The helium-3 detection arrangement of claim 1, wherein the metal plate is located less than 10 cm from a granular surface when the thermal neutron source is emitting the thermal neutrons.

9. The helium-3 detection arrangement of claim 1, wherein the metal plate comprises handles configured to be carried by at least one human or robot.

10. The helium-3 detection arrangement of claim 1, further comprising a low gravity skipper.

11. A helium-3 detection system comprising:
   a thermal neutron source configured to emit thermal neutrons in all directions;
   a thermal neutron detection system configured to detect a neutron concentration of the thermal neutrons backscattered from granular soil;

a neutron shield interposed between the thermal neutron source and the thermal neutron detection system;

a power source configured to provide power to the thermal neutron source and the thermal neutron detection system; and a metal plate comprising the neutron shield, the thermal neutron source, and the thermal neutron detection system.

12. The helium-3 detection system of claim 11, wherein the neutron shield is configured to block at least 90% of the thermal neutrons emitted from the thermal neutron source that are aimed at the thermal neutron detection system.

13. The helium-3 detection system of claim 11, further comprising a computer system configured to calculate a concentration of helium-3 in the granular soil, which is inversely proportional to the neutron concentration of the thermal neutrons.

14. The helium-3 detection system of claim 11, wherein the neutron shield is a boronated shield.

15. The helium-3 detection system of claim 11, further comprising a transmitter configured to transmit the neutron concentration of the thermal neutrons.

16. The helium-3 detection system of claim 11, further comprising a transport that is configured to be moved to different locations on a surface of a celestial body, the transport is selected from a group consisting of a rover, a low gravity skipper, and a robot.

17. The helium-3 detection system of claim 11, wherein the neutron shield is at between 1 and 4 inches thick.

18. An arrangement that detects helium-3 in a regolith on the Moon, the arrangement comprising:

a neutron source configured to emit thermal neutrons;

a neutron detector configured to detect a neutron concentration of the thermal neutrons that are backscattered from the regolith;

a neutron shield interposed between the neutron source and the neutron detector, the neutron shield configured to block at least some of the thermal neutrons in a line-of-sight between the neutron source and the neutron detector;

a power source configured to provide power to the neutron source and the neutron detector;

a transmitter configured to transmit the neutron concentration of the thermal neutrons;

a metal plate comprising the neutron shield, the neutron source, and the neutron detector disposed thereon; and a transporter configured to move the arrangement to different locations on a surface of the Moon.

19. The arrangement of claim 18, wherein the neutron shield attenuates at least 95% of the thermal neutrons.

20. The arrangement of claim 18, further comprising a computer system configured to calculate a concentration of helium-3 in the regolith indirectly from the neutron concentration of the thermal neutrons.

* * * * *